(12) United States Patent
Verlare et al.

(10) Patent No.: US 8,341,221 B2
(45) Date of Patent: Dec. 25, 2012

(54) INSTANT MESSENGER LOCATION BUDDY

(75) Inventors: James L. Verlare, Colorado Springs, CO (US); Paul T. Schultz, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 330 days.

(21) Appl. No.: 11/849,034

(22) Filed: Aug. 31, 2007

(65) Prior Publication Data

US 2008/0084973 A1   Apr. 10, 2008

Related U.S. Application Data

(60) Provisional application No. 60/828,350, filed on Oct. 5, 2006, provisional application No. 60/938,036, filed on May 15, 2007.

(51) Int. Cl.
*G06F 15/16* (2006.01)
(52) U.S. Cl. ......................... 709/204; 709/205
(58) Field of Classification Search ........... 709/204–205
See application file for complete search history.

(56) References Cited

U.S. PATENT DOCUMENTS

| | | | |
|---|---|---|---|
| 6,259,771 B1 * | 7/2001 | Kredo et al. ............... | 379/88.17 |
| 2002/0103917 A1 * | 8/2002 | Kay et al. ...................... | 709/229 |
| 2002/0161862 A1 * | 10/2002 | Horvitz ........................ | 709/220 |
| 2003/0016657 A1 * | 1/2003 | Creamer et al. ............... | 370/352 |
| 2003/0093480 A1 * | 5/2003 | Lagarde et al. ............... | 709/206 |
| 2004/0008635 A1 * | 1/2004 | Nelson et al. ................. | 370/260 |
| 2005/0086309 A1 * | 4/2005 | Galli et al. .................... | 709/206 |
| 2005/0138132 A1 * | 6/2005 | Zhou et al. .................... | 709/207 |
| 2005/0249196 A1 * | 11/2005 | Ansari et al. .................. | 370/352 |
| 2006/0150119 A1 * | 7/2006 | Chesnais et al. .............. | 715/810 |
| 2007/0016490 A1 * | 1/2007 | Nowak ........................... | 705/26 |
| 2007/0043878 A1 * | 2/2007 | Carlson et al. ................ | 709/246 |
| 2007/0050463 A1 * | 3/2007 | Shaffer et al. ................. | 709/207 |
| 2007/0250580 A1 * | 10/2007 | Caspi et al. ................... | 709/206 |

OTHER PUBLICATIONS

Gray Norton; Creating Lotus Instant Messaging Interactive Agents with the BuddyScript SDK Part 1; Publish Jan. 2004; retrieved from http://www.ibm.com/developerworks/lotus/library/ls-BuddyScript1/index.html.*

* cited by examiner

*Primary Examiner* — Carl Colin
*Assistant Examiner* — Chau Le

(57) ABSTRACT

A device may provide information identifying an entity, which includes a business or individual, to a user during an instant messaging session between the user and the device. The device may further promote the instant messaging session to a multimedia session between a first device associated with the user and a second device associated with the entity. The first device and the second device are different than the device.

18 Claims, 23 Drawing Sheets

| DATE/TIME 625 | PREFERRED DEVICE(S) 630 |
|---|---|
| M-F, 8:00 AM – 6:00 PM | WORK PHONE (555-555-1212), CELL PHONE (555-555-1213), INSTANT MESSENGER (JACK_IM_ADDR) |
| M-F, 6:30 PM – 7:30 AM | HOME PHONE (JACK@HOME-SIP.COM), INSTANT MESSENGER (JACK_IM_ADDR) |
| WEEKENDS | HOME PHONE (JACK@HOME-SIP.COM), CELL PHONE (555-555-1213) |

FIG. 6B

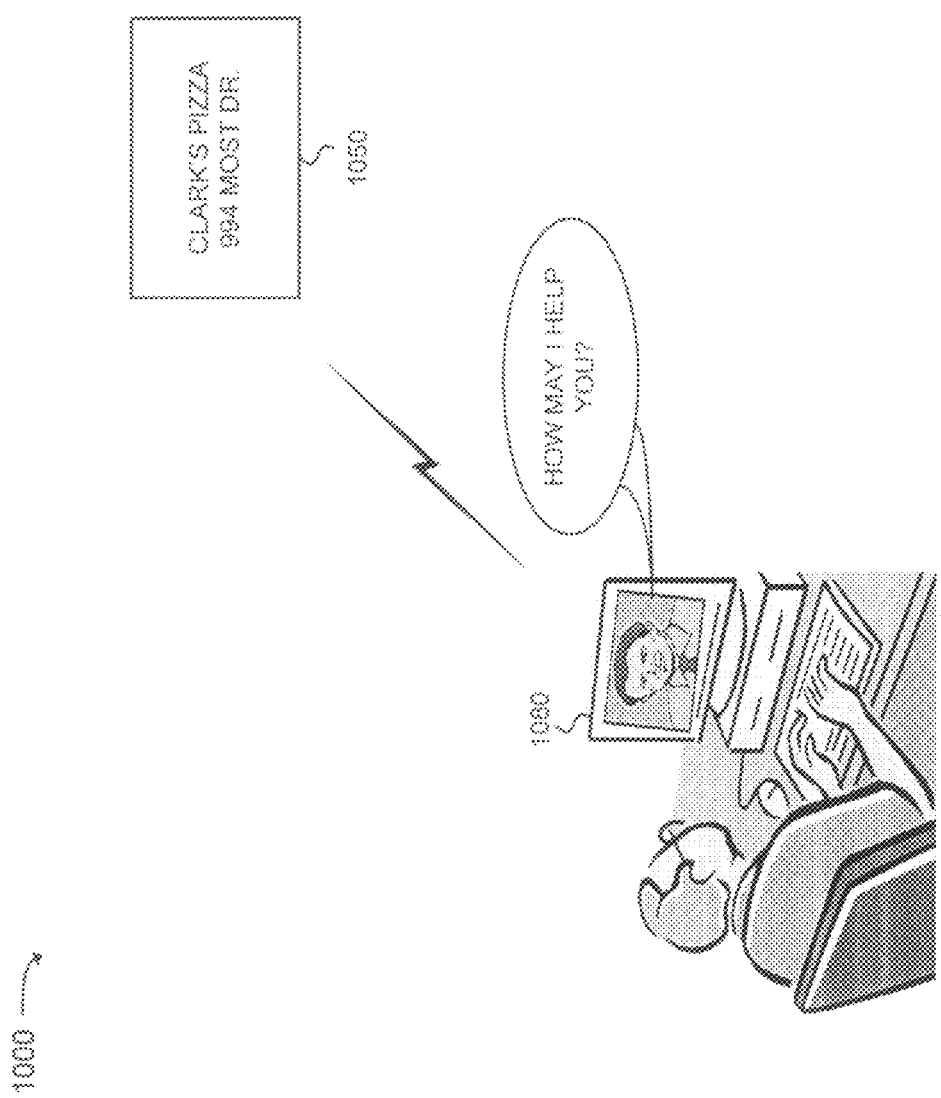

INSTANT MESSENGER LOCATION BUDDY

PRIORITY INFORMATION

The present application claims priority to U.S. Provisional Patent Application No. 60/828,350, filed Oct. 5, 2006, and U.S. Provisional Patent Application No. 60/938,036, filed May 15, 2007. The contents of both of these applications are incorporated herein by reference in their entireties.

BACKGROUND INFORMATION

People often turn to the Internet to find information regarding businesses or individuals. For example, if a person is interested in finding an address of a local restaurant, the person may perform an Internet search using a search engine. Once the address is found, if the person is interested in making a reservation at the restaurant, the person may place a telephone call to the restaurant.

BRIEF DESCRIPTION OF THE DRAWINGS

FIG. 6B is an exemplary diagram of a portion of a second computer-readable medium that may be associated with the location buddy of FIG. 2;

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1A:
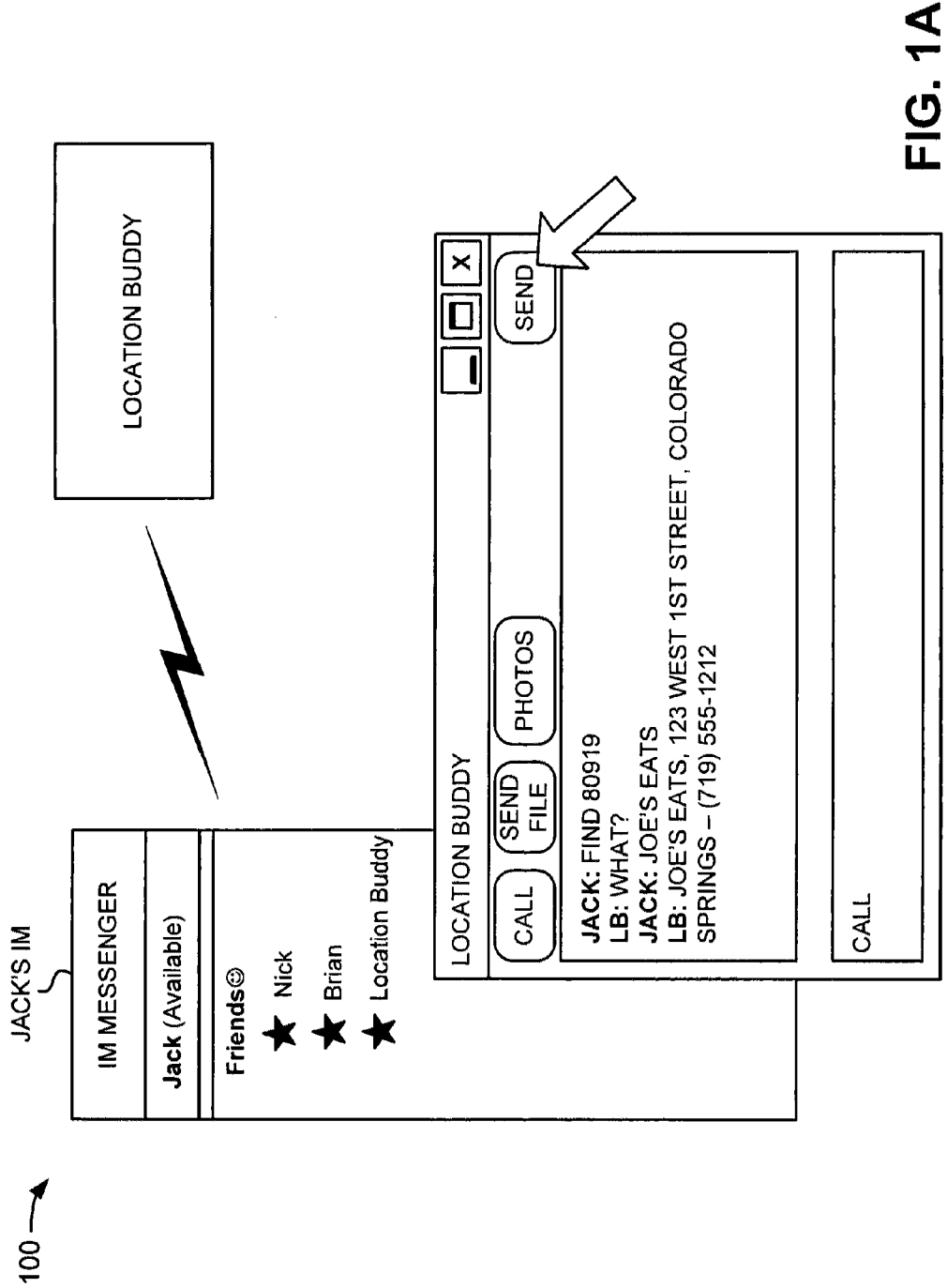
FIGS. 1A and 1B are exemplary diagrams illustrating a concept described herein.
Figure 1B:
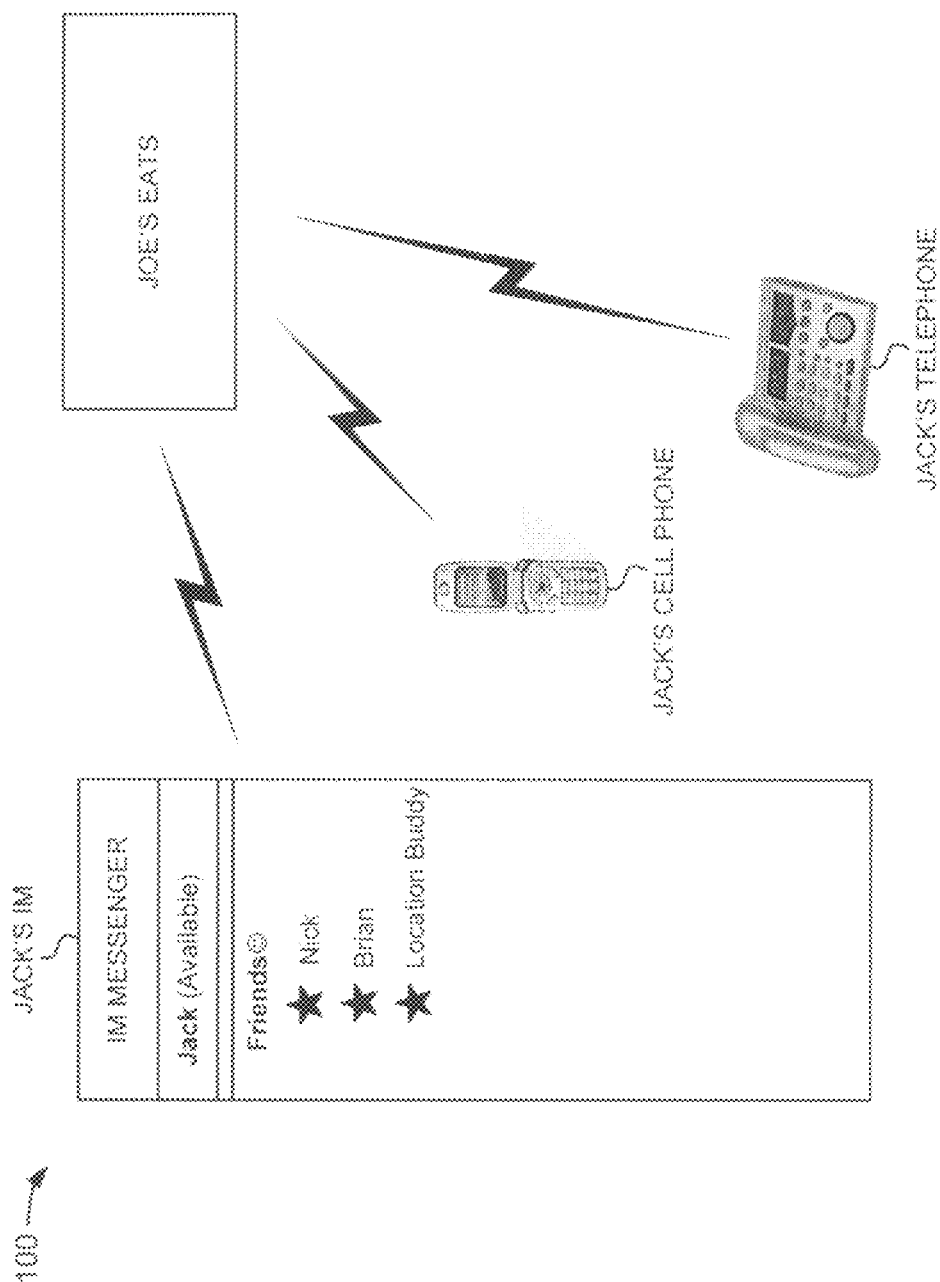

FIGS. 1A and 1B are exemplary diagrams illustrating a concept 100 described herein. As illustrated in FIG. 1A, a user "Jack" may initiate an instant messaging (IM) session with a location buddy. In one embodiment, the location buddy may provide information of interest to the user. The information may include, for example, business-related information (e.g., an address for a particular business, a telephone number for the particular business, a link to a map of where the particular business is located, a video related to the business, etc.) and/or non-business-related information (e.g., an address for an individual, a telephone number for an individual, a link to a map of where the individual lives, etc.). Moreover, location buddy may allow a user to initiate a multimedia (e.g., voice and/or video) session (e.g., via the instant messenger interface) with a particular business/individual. In this way, the user may promote a location query chat session to a voice/video session between the instant messenger user and the location query result.

In the example of FIG. 1A, once the instant messaging session with the location buddy has been established, the user may request location information from the location buddy. For example, Jack may request the location of a business called "Joe's Eats" in the zip code 80919. In response, the location buddy may look up the appropriate business information and provide the business information to Jack. As illustrated, the business information may include, for example, the name of the business (e.g., "Joe's Eats"), an address of the business (e.g., "123 West 1st Street, Colorado Springs"), and a telephone number for the business (e.g., "(719) 555-1212"). Jack may cause a telephone call to be placed to Joe's Eats by, for example, entering a particular sequence of characters into the instant messenger interface, selecting a menu item provided in the instant messenger interface, and/or clicking a button on the instant messenger interface. In the example of FIG. 1A, Jack may enter the phrase "call" to cause the location buddy to automatically establish a voice (or video) session between one of Jack's telephone devices (e.g., a software client associated with Jack's instant messenger, a Session Initiation Protocol (SIP) telephone, a cell phone, a plain old telephone system (POTS) telephone, or another type of telephone device) and a telephone device at Joe's Eats, as illustrated in FIG. 1B. Jack may configure the location buddy to use one type of telephone device over another type of telephone device based on one or more criteria.

Figure 2:
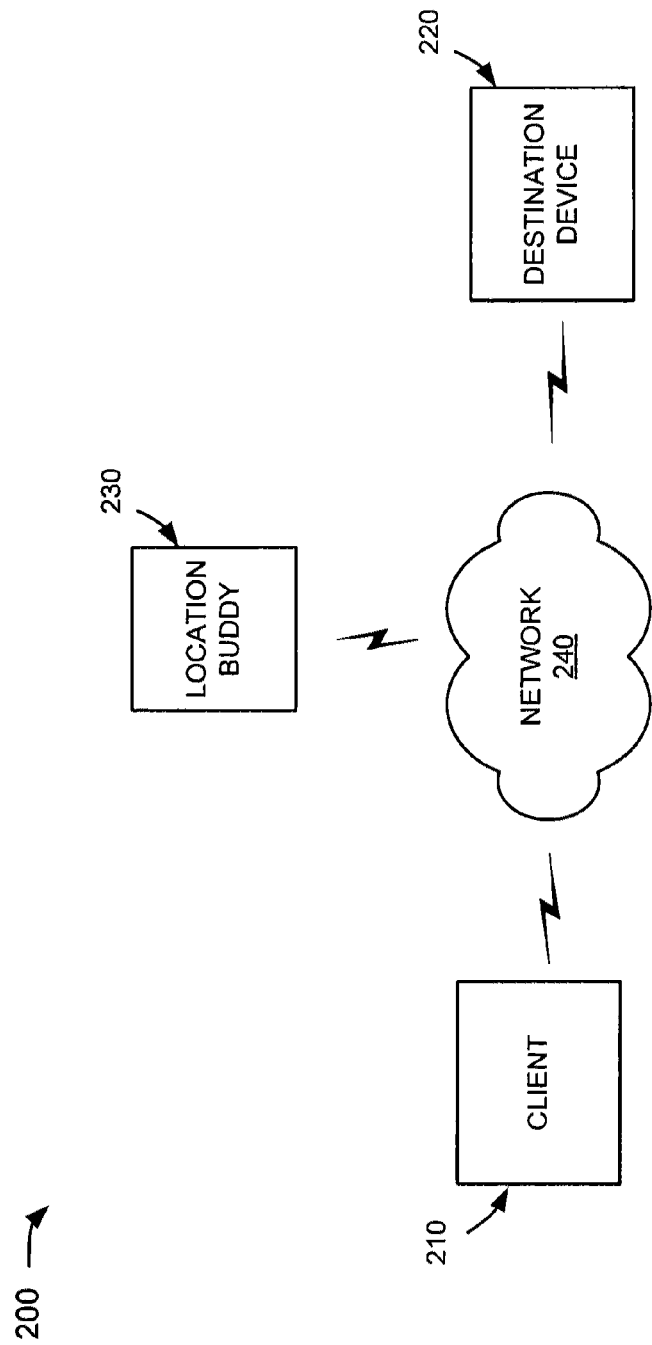
FIG. 2 is an exemplary network in which systems and methods, consistent with exemplary embodiments, may be implemented.

FIG. 2 is an exemplary network in which systems and methods, consistent with exemplary embodiments, may be implemented. As illustrated, network 200 may include a client 210, a destination device 220, a location buddy 230, and a network 240. The number of clients 210, destination devices 220, location buddies 230, and networks 240 illustrated in FIG. 2 is provided for simplicity. In practice, there may be more clients 210, destination devices 220, location buddies 230, and/or networks 240.

Client 210 may include a client entity. An entity may be defined as a device, such as a computer or another type of computation or communication device, a thread or process running on one of these devices, and/or an object executable by one of these devices. In one embodiment, client 210 may include a personal computer, a laptop, a wireless device (e.g., a cellular telephone, a personal digital assistant (PDA), etc.), and/or any other type of device that may execute an instant messenger application. In addition, client 210 may include other types of telephone and/or video conferencing devices. For example, client 210 may also include a POTS telephone, a Session Initiation Protocol (SIP) telephone, a set top box that provides voice and/or video sessions, and/or other types of telephone/video conferencing devices. Client 210 may connect to network 240 via wired and/or wireless connections.

Destination device 220 may include a device capable of receiving and/or transmitting voice and/or video signals to a network, such as network 240. In one implementation, destination device 220 may include a type of telephone and/or video conference device, such as a POTS telephone, a SIP telephone, a wireless telephone device, etc. In addition or alternatively, destination device 220 may include a type of computer system, such as a mainframe, minicomputer, personal computer, a laptop, or the like. Destination device 220 may connect to network 240 via wired and/or wireless connections.

Location buddy 230 may include a server entity. As indicated above, an entity may be defined as a device, such as a computer or another type of computation or communication device, a thread or process running on one of these devices, and/or an object executable by one of these devices. In one embodiment, location buddy 230 may provide business-related and/or non-business-related information to client 210 during an instant messaging session. Location buddy 230 may further allow a user of client 210 to establish a telephone call to business and/or individual. Location buddy 230 may connect to network 240 via wired and/or wireless connections.

Network 240 may include one or more networks of any type, including a Public Land Mobile Network (PLMN), a Public Switched Telephone Network (PSTN), a local area network (LAN), a metropolitan area network (MAN), a wide area network (WAN), an Internet Protocol Multimedia Subsystem (IMS) network, a private network, the Internet, an intranet, and/or another type of network.

One or more components of network 200 may perform one or more of the tasks described as being performed by one or more other components of network 200.

Figure 3:
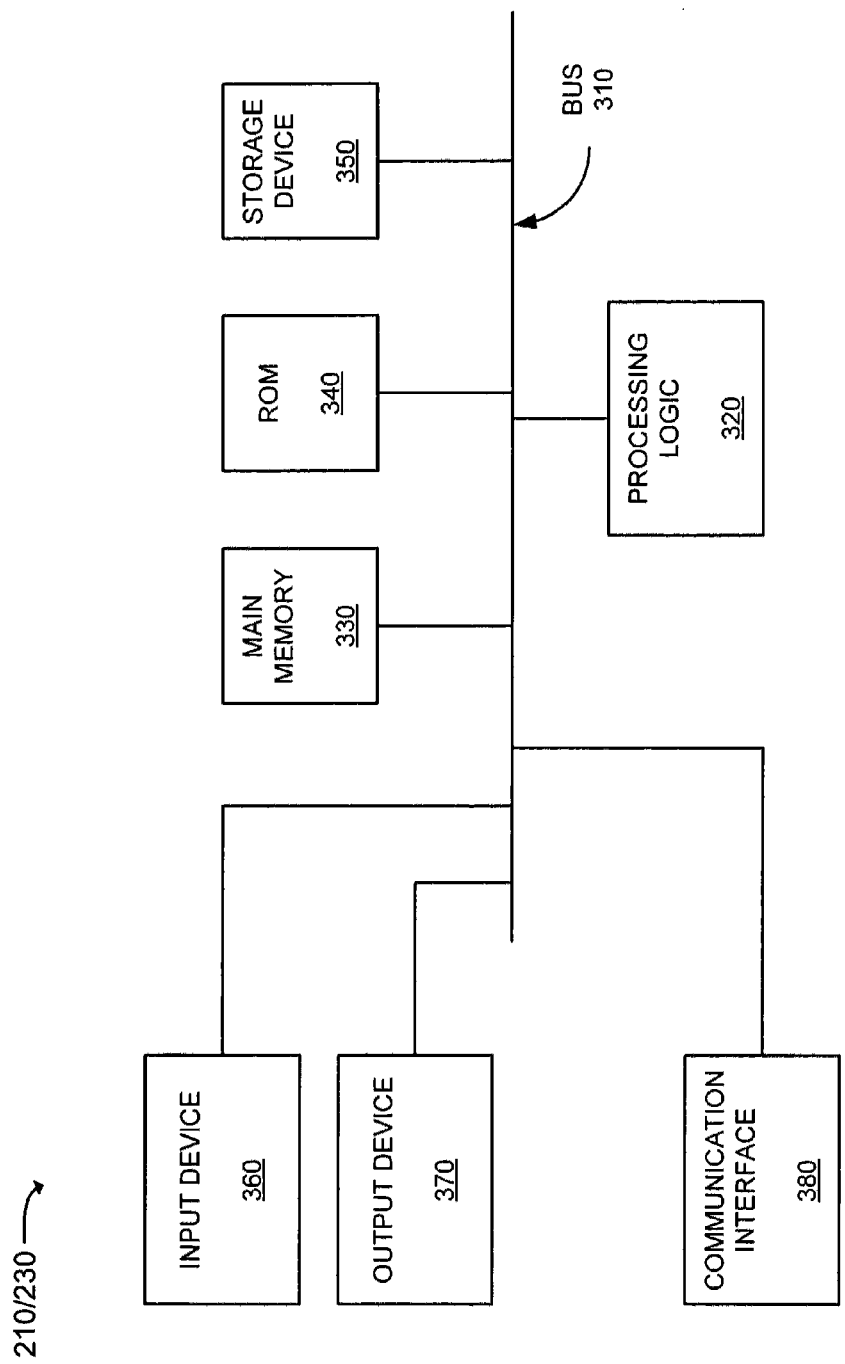
FIG. 3 is an exemplary block diagram of the client and/or location buddy of FIG. 2.

FIG. 3 is an exemplary block diagram of client 210 and/or location buddy 230 in one embodiment. As illustrated, client 210/location buddy 230 may include a bus 310, processing logic 320, a main memory 330, a read only memory (ROM) 340, a storage device 350, an input device 360, an output device 370, and/or a communication interface 380. In one embodiment, client 210/location buddy 230 may include fewer, additional, or different components than illustrated in FIG. 3.

Bus 310 may include a path that permits communication among the components of client 210/location buddy 230. Processing logic 320 may include a processor, a microprocessor, or other types of processing logic, such as an application specific integrated circuit (ASIC), a field programmable gate array (FPGA), etc., that may interpret and execute instructions. Main memory 330 may include a RAM or another type of dynamic storage device that may store information and instructions for execution by processing logic 320. ROM 340 may include a ROM device or another type of static storage device that may store static information and instructions for use by processing logic 320. Storage device 350 may include a magnetic and/or optical recording medium and its corresponding drive.

Input device 360 may include a mechanism that permits an operator to input information to client 210/location buddy 230, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables client 210/location buddy 230 to communicate with other devices and/or systems via a network, such as network 240.

As will be described in detail below, client 210/location buddy 230 may perform certain operations. Client 210/location buddy 230 may perform these and other operations in response to processing logic 320 executing software instructions contained in a computer-readable medium, such as main memory 330. A computer-readable medium may be defined as a physical or logical memory device and/or carrier wave.

The software instructions may be read into main memory 330 from another computer-readable medium, such as storage device 350, or from another device via communication interface 380. The software instructions contained in main memory 330 may cause processing logic 320 to perform processes that will be described later. Alternatively, hard-wired circuitry may be used in place of, or in combination with, software instructions to implement processes consistent with exemplary embodiments. Thus, embodiments described herein are not limited to any specific combination of hardware circuitry and software.

Figure 4:
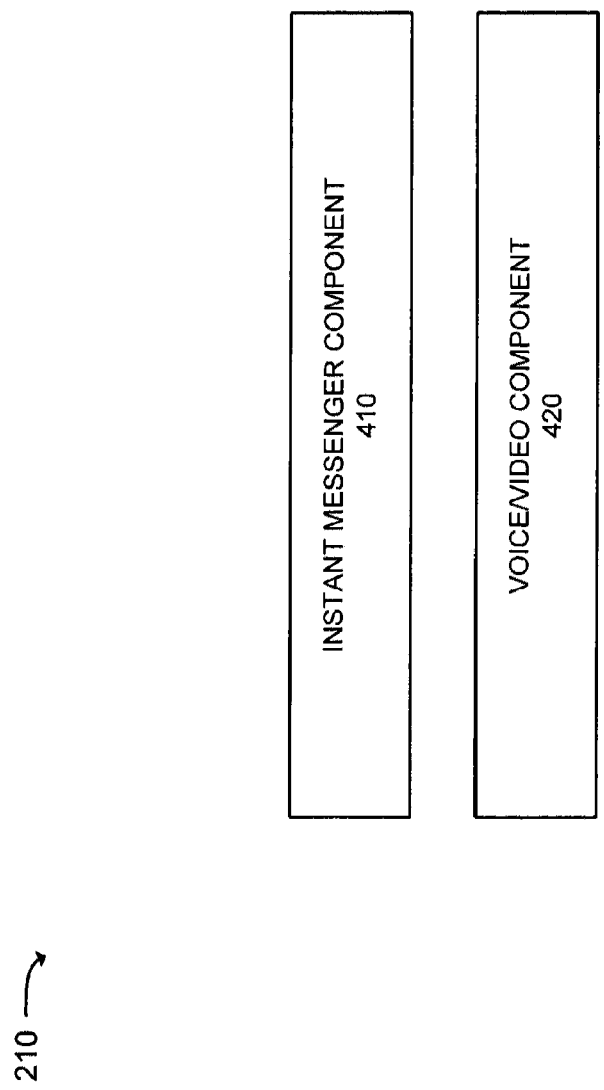
FIG. 4 is an exemplary functional diagram of a portion of the client of FIG. 2.

FIG. 4 is an exemplary functional diagram of a portion of client 210 according to an exemplary embodiment. As illustrated, client 210 may include an instant messenger component 410 and a voice/video component 420. In other embodiments, client 210 may include other components (not shown) that aid in allowing a user to obtain business and/or individual information and to establish voice and/or video sessions with businesses and/or individuals.

Instant messenger component 410 may include one or more components that provide instant messaging services. For example, instant messenger component 410 may provide an instant messenger interface that allows a user to send instant messages and receive instant messages to/from an entity included in the user's instant messenger buddy list (which may include a list of friends, family, coworkers, and others that the user has identified for display on the user's instant messenger interface) or another entity identified by the user.

Voice/video component 420 may include one or more components that allow the user to conduct a voice and/or video session with an entity. For example, voice/video component 420 may receive voice signals and cause the voice signals to be audibly provided to a user of client 210. Moreover, voice/video component 420 may receive video signals and cause the video signals to be visually provided to the user of client 210.

One or more components of the portion of client 210 may perform one or more of the tasks described as being performed by one or more other components of the portion of client 210.

Figure 5:
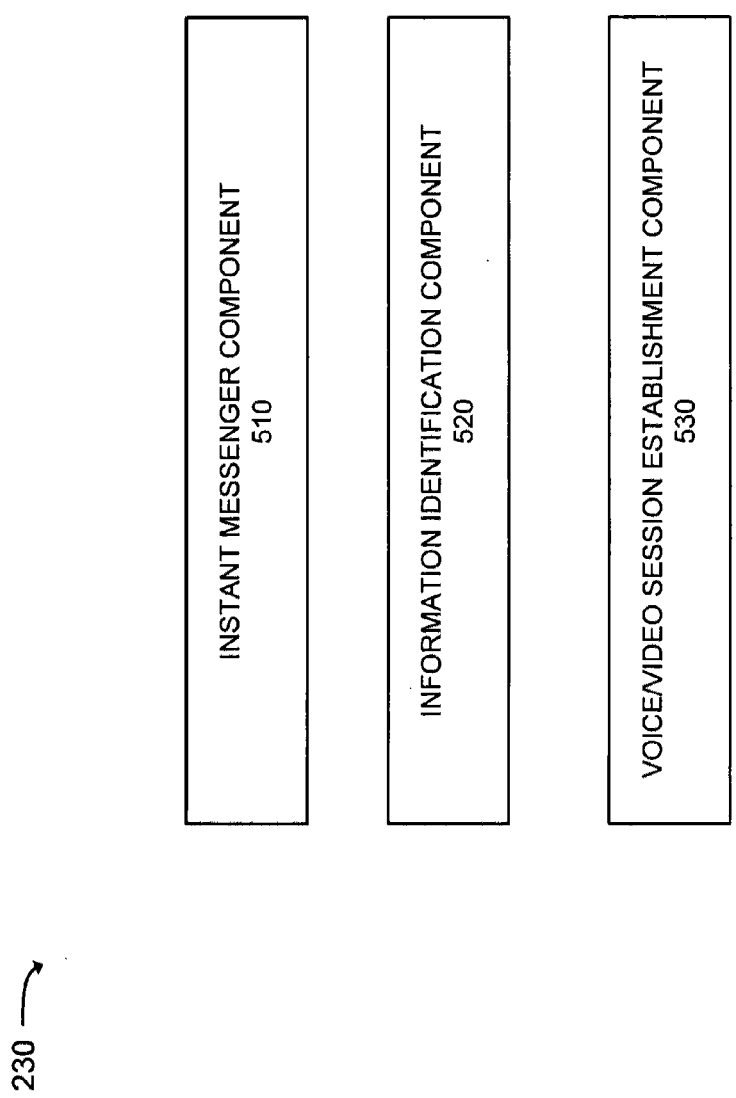
FIG. 5 is an exemplary functional diagram of a portion of the location buddy of FIG. 2.

FIG. 5 is an exemplary functional diagram of a portion of location buddy 230 according to an exemplary embodiment. As illustrated, the portion of location buddy 230 may include an instant messenger component 510, an information identification component 520, and a voice/video session establishment component 530. In other embodiments, location buddy 230 may include other components (not shown) that aid in allowing a user to obtain business and/or individual information and to establish voice/video sessions with businesses and/or individuals.

Instant messenger component 510 may include one or more components that provide instant messaging services. For example, instant messenger component 510 may receive instant messages from and provide instant messages to a client, such as client 210.

Information identification component 520 may include one or more components that receive requests for information for a business or individual in instant messages and retrieve the appropriate information from a database of information. The information may include a business or individual's name, an address, a telephone number, and/or other types of information. To identify the appropriate information to retrieve, information identification component 520 may use one or more terms in a received request and may perform a database search using the one or more terms. Many techniques for performing a database search are possible. The database search may result in a ranked list of possible matching database entries. In this situation, information identification component 520 may select a highest ranked matching database entry or entries.

Voice/video session establishment component 530 may include one or more components that cause a voice and/or video session to be established between a client, such as client 210, and a destination device, such as destination device 220. A voice session may include, for example, a PSTN voice call or a SIP call. In one embodiment, voice/video session establishment component 530 may establish a voice session by sending a call request to a SIP application server, which may then establish the voice session to destination device 220, via a data network (e.g., the Internet, an IMS network, etc.) and/or a PSTN.

One or more components of the portion of location buddy 230 may perform one or more of the tasks described as being performed by one or more other components of the portion of location buddy 230.

Figure 6A:
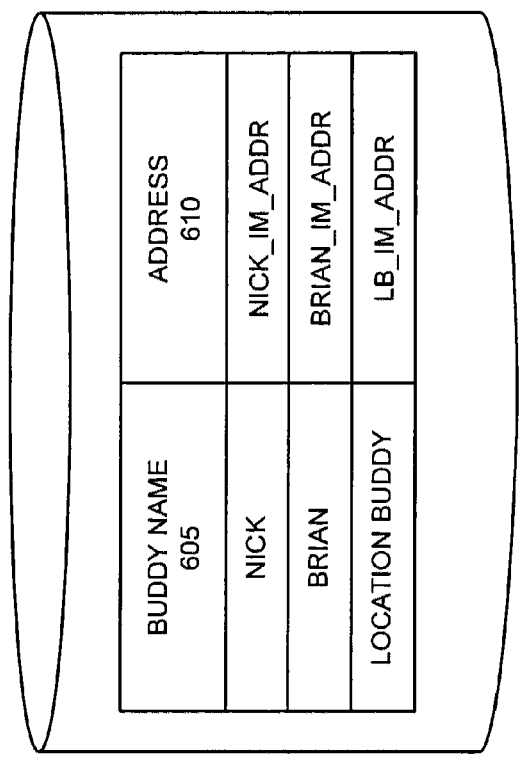
FIG. 6A is an exemplary diagram of a portion of a first computer-readable medium that may be associated with the location buddy of FIG. 2.

FIG. 6A is an exemplary diagram of a portion of a computer-readable medium 600 that may be associated with location buddy 230. Computer-readable medium 600 may correspond to a buddy list for an instant messenger user. While only one computer-readable medium is described below, it will be appreciated that computer-readable medium 600 may include multiple computer-readable media stored locally at location buddy 230, or stored at one or more different and possibly remote locations (e.g., at client 210).

As illustrated, computer-readable medium 600 may maintain a group of entries in the following exemplary fields: a buddy name field 605 and an address field 610. Computer-readable medium 600 may maintain additional or different information (not shown) relating to maintaining a particular instant messenger buddy list.

Buddy name field 605 may store a sequence of characters for an entity on a buddy list associated with client 210. The sequence of characters may include the name that will appear on an instant messenger interface. In one embodiment, an entry stored in buddy name field 605 may store information relating to location buddy 230.

Address field 610 may store a network address for the sequence of characters stored in the corresponding buddy name field 605. The network address may correspond to an instant messenger address, electronic mail (e-mail) address, or another type of address. As illustrated in FIG. 6A, "Location Buddy" may be associated with an address of "LB_I-M_ADDR."

FIG. 6B is an exemplary diagram of a portion of another computer-readable medium 620 that may be associated with location buddy 230. Computer-readable medium 620 may correspond to a device preferences table for a user. While only one computer-readable medium is described below, it will be appreciated that computer-readable medium 620 may include multiple computer-readable media stored locally at location buddy 230, or stored at one or more different and possibly remote locations (e.g., at client 210).

As illustrated, computer-readable medium 620 may maintain a group of entries in the following exemplary fields: a date/time field 625 and a preferred device(s) field 630. Computer-readable medium 620 may maintain additional or different information (not shown) relating to identifying a device preference for a user for voice sessions. Additionally or alternatively, computer-readable medium 620 may maintain device preference information for a user for video sessions.

Date/time field 625 may store date information and/or time information. In one embodiment, the date information may include, for example, a specific date, a range of dates, a day of the week, a range of days of a week, etc. In the example of FIG. 6B, the date information may be specified as Mondays through Fridays (M-F), weekends, etc. In one embodiment, the time information may include, for example, a specific time, a range of times, ranges of time, etc. In the example of FIG. 6B, the time information may not be present in some situations.

Preferred device(s) field 630 may store information identifying a preferred device or a sequence of devices for the date/time specified in date/time field 625. The information may include an address for the preferred device(s) (e.g., a PSTN telephone number, a SIP number, an instant messenger address, etc.). The user's devices may also provide Presence status information that can be used for further user device selection discrimination.

In the example of FIG. 6B, the user has specified that on Mondays through Fridays, at 8:00 am to 6:00 pm, voice sessions are to be established to the user's work telephone (telephone number 555-555-1212). If the user's work telephone is not available, the user has specified that voice sessions are to be established to the user's cell phone (telephone number 555-555-1213). If the user's work telephone and cell phone are not available, the user has specified that voice sessions are to be established to the user's instant messenger (address JACK_IM_ADDR). As further illustrated in FIG. 6B, the user has specified that on Mondays through Fridays, at 6:30 pm to 7:30 am, voice sessions are to be established to the user's home telephone (SIP number JACK@HOME-SIP.COM). If the user's home telephone is not available, the user has specified that voice sessions are to be established to the user's instant messenger (address JACK_IM_ADDR). As still further illustrated in FIG. 6B, the user has specified that on weekends, voice sessions are to be established to the user's home telephone (SIP number JACK@HOME-SIP.COM). If the user's home telephone is not available, the user has specified that voice sessions are to be established to the user's cell phone (telephone number 555-555-1213).

Figure 6C:
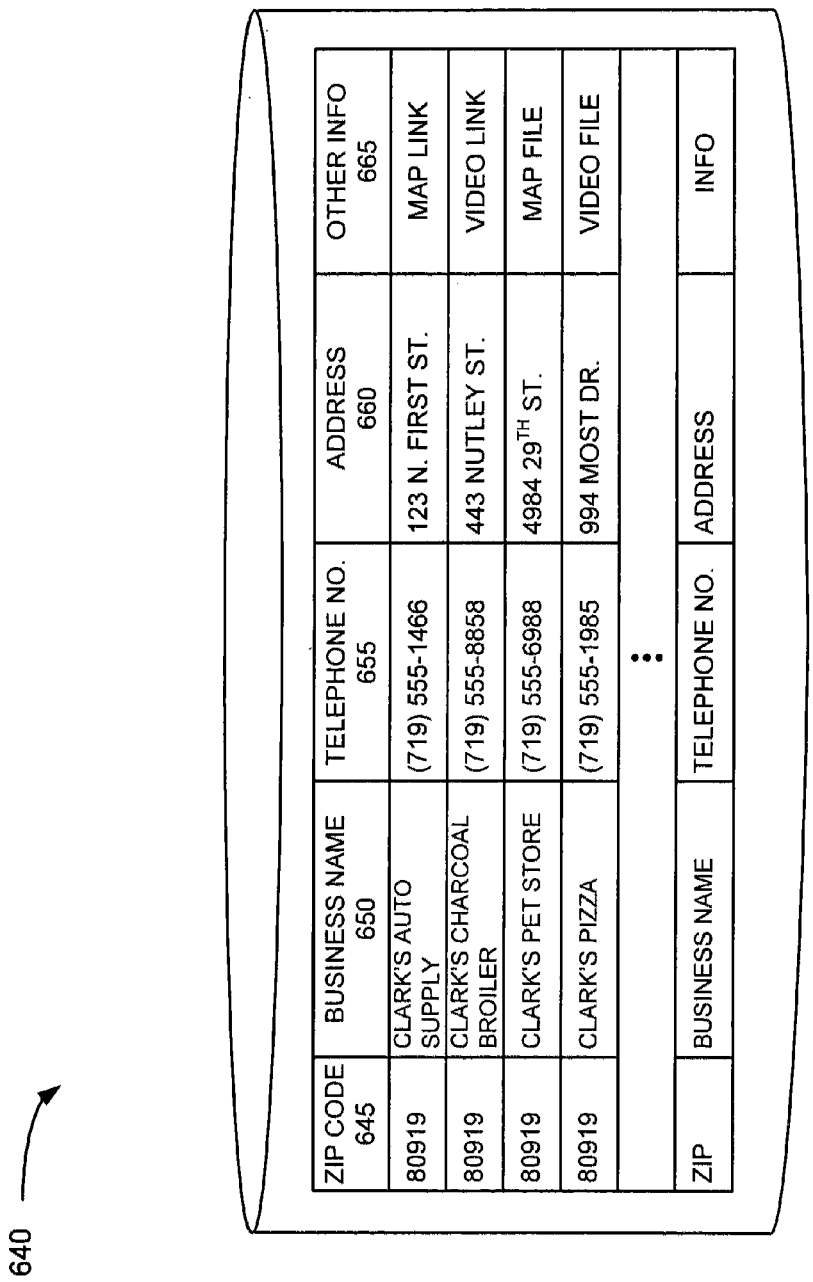
FIG. 6C is an exemplary diagram of a portion of a database that may be associated with the location buddy of FIG. 2.

FIG. 6C is an exemplary diagram of a database 640 that may be associated with location buddy 230. While only one database is described below, it will be appreciated that database 640 may include multiple databases stored locally at location buddy 230, or stored at one or more different and possibly remote locations. In one embodiment, database 640 may be provided by a third party.

As illustrated, database 640 may maintain a group of entries in the following exemplary field: a zip code field 645, a business name field 650, a telephone number (no.) field 655, an address field 660, and another information field 665. Database 640 may maintain fewer, additional, or different information relating to businesses. While database 640 includes business information, it will be appreciated that database 640 could additionally include individual information and/or other information.

Zip code field 645 may store a zip code or other type of identification information for identifying a region in the United States or a foreign country. Business name field 650 may store a name of a business in the zip code identified in zip code field 645. Telephone number field 655 may store a telephone number for the business identified in business name field 650. Address field 660 may store a partial or full address of the location of the business identified in business name field 650. Other information field 665 may store additional information relating to the business identified in business name field 650. The additional information may include, for example, a map (e.g., as an image file) or a link to a map that shows the location identified in address field 660, an image (e.g., as an image file) or a link to an image that shows information relating to the business (e.g., a picture of the exterior and/or interior of the business, a logo for the business, an advertisement for the business, etc.), a video (e.g., as a video file) or a link to a video that shows information relating to the business (e.g., an advertisement, a video of the front of the business, etc.), a network address to which a video session may be established, a Uniform Resource Locator (URL) to a web page associated with the business, and/or other information relating to the business.

As an example, the business "Clark's Pizza" is located in zip code 80919, has an address of 994 Most Drive, and a telephone number of (719) 555-1985. The entry for Clark's Pizza is also associated with a link to a video that shows the exterior of Clark's Pizza.

Figure 7:
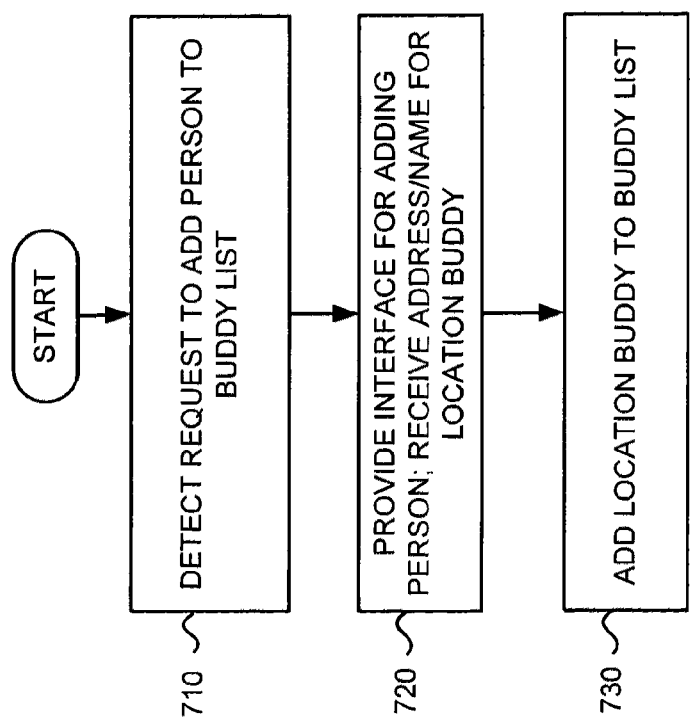
FIG. 7 is a flow chart of exemplary processing for adding the location buddy of FIG. 2 to an instant messenger buddy list associated with the client of FIG. 2.

FIG. 7 is a flow chart of exemplary processing for adding location buddy 230 to an instant messenger buddy list associated with client 210. In one embodiment, the processing of FIG. 7 may be performed by client 210. In another embodiment, some or all of the processing described below may be performed by another device.

Processing may begin with client 210 detecting a request to add a person to a buddy list (block 710). In one embodiment, client 210 may provide an instant messenger interface to a user that allows the user to add a new person to the user's buddy list. The instant messenger interface may include a button, menu item, a text entry box, and/or another mechanism that allows the user to indicate a desire to add a new person to the user's buddy list. Client 210 (e.g., via instant messenger component 410) may detect the user's indication to add the new person.

Client 210 may provide an interface for adding the new person in response to detecting the request (block 720). For example, client 210 (e.g., via instant messenger component 410) may retrieve a user interface and provide that user interface to the user. The user interface may include a section that allows the user to enter information identifying an instant messenger address (or other address) for the person to be added to the user's buddy list. The user interface may also allow the user to enter a name to be displayed in instant messenger interface for the person that is to be added.

Client 210 may receive an instant messenger address (or other address) for location buddy 230 from the user (block 720). Client 210 may also receive additional information relating to location buddy 230 (e.g., a name to be displayed in the instant messenger interface).

Client 210 may (e.g., via instant messenger component 410) add the received name and address for location buddy 230 to the user's buddy list (block 730). For example, client 210 may transfer the name and address to location buddy 230 for storage in buddy name field 605 and address field 610, respectively.

Figure 8A:
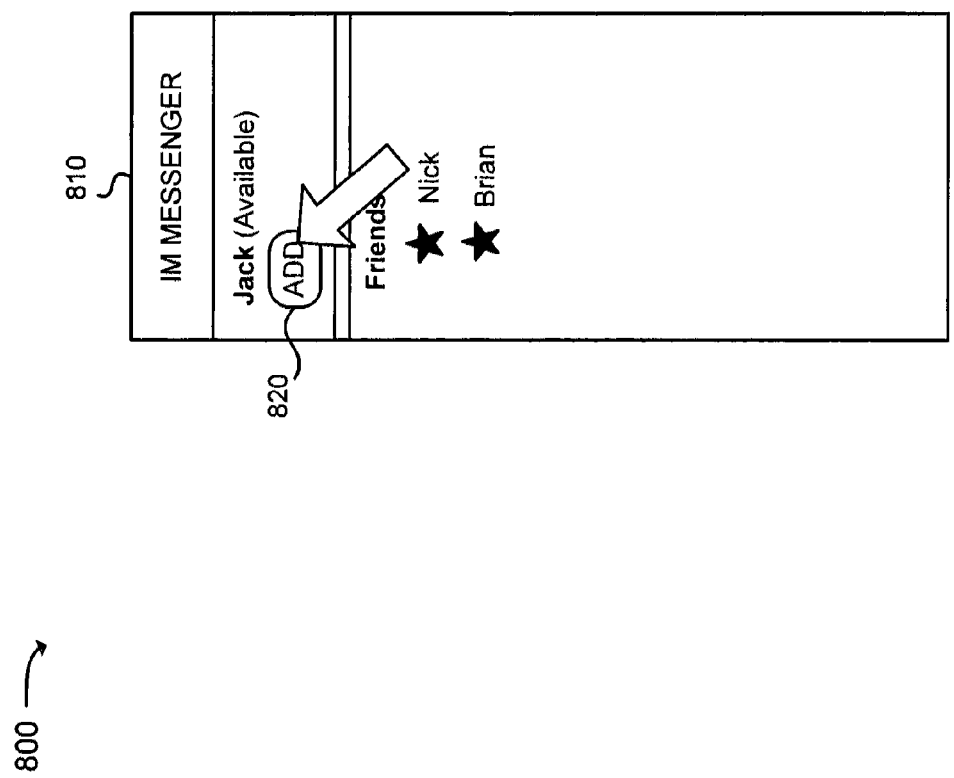
FIGS. 8A-8C illustrate an example of the processing described with respect to FIG. 8.
Figure 8B:
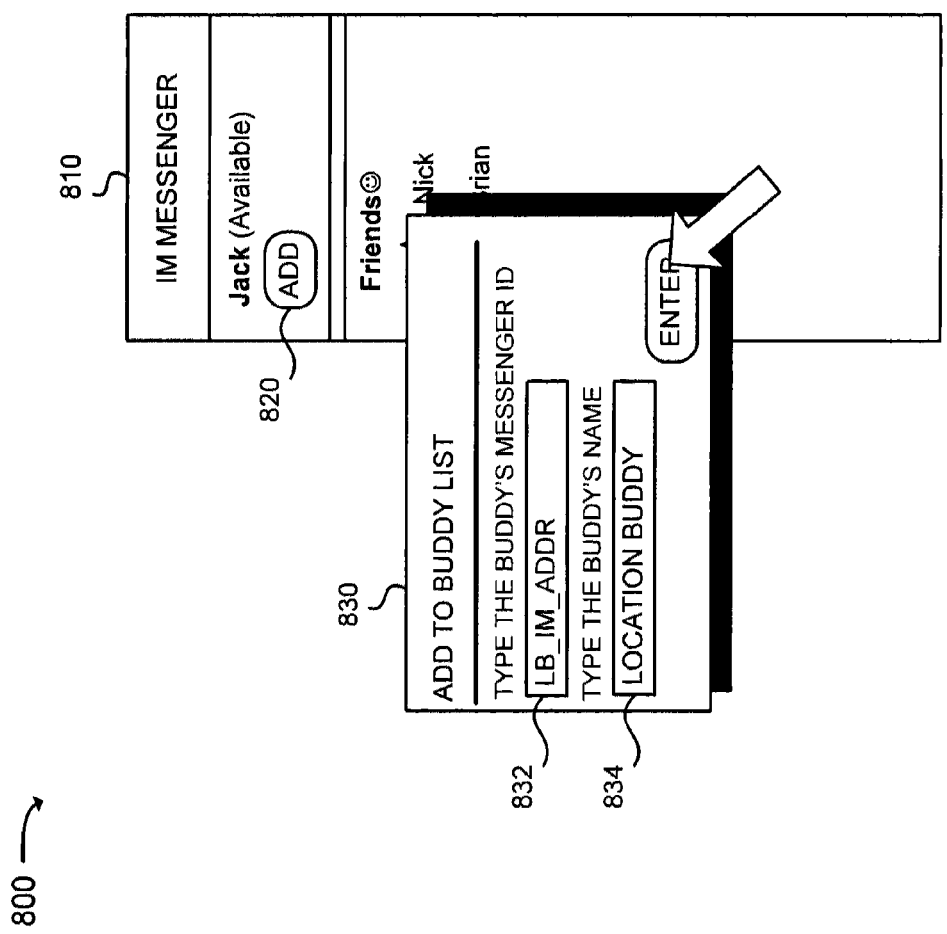
Figure 8C:
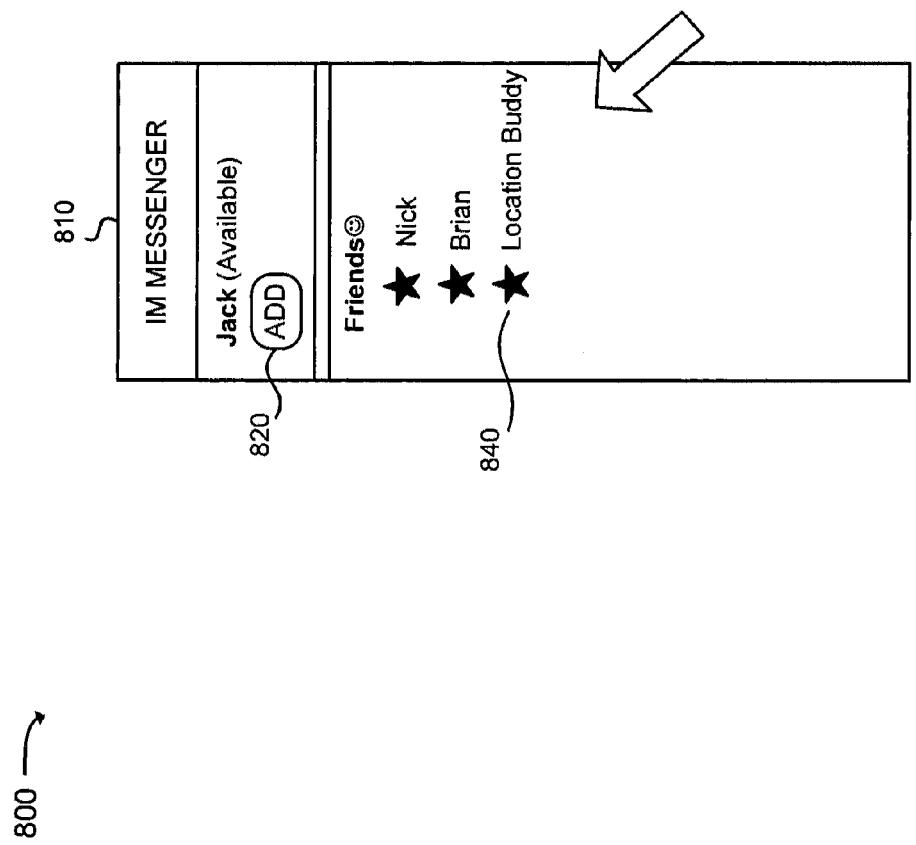

The following example 800 of FIGS. 8A-8C illustrates the processing described above with respect to FIG. 7. Assume that a user (Jack) is currently running an instant messenger 810, as illustrated in FIG. 8A. Assume further that Jack wants to add location buddy 230 to his list of friends displayed in his instant messenger 810. To add location buddy 230, Jack may select an "ADD" button 820 provided on instant messenger 810.

In response to selecting "ADD" button 820, instant messenger 810 may provide a user interface 830 to the user, as illustrated in FIG. 8B. User interface 830 may include a first field 832 that allows the user to enter an address for the person to be entered (i.e., location buddy 230 in this example). User interface 830 may further include a second field 834 that allows the user to enter a name to be displayed in instant messenger 810 for location buddy 230. Once entered, the user may cause the address and name to be stored, for example, in computer-readable medium 600 by selecting the "ENTER" button. By selecting the "ENTER" button, a name 840 for location buddy 230 may appear in instant messenger 810, as illustrated in FIG. 8C.

Figure 9:
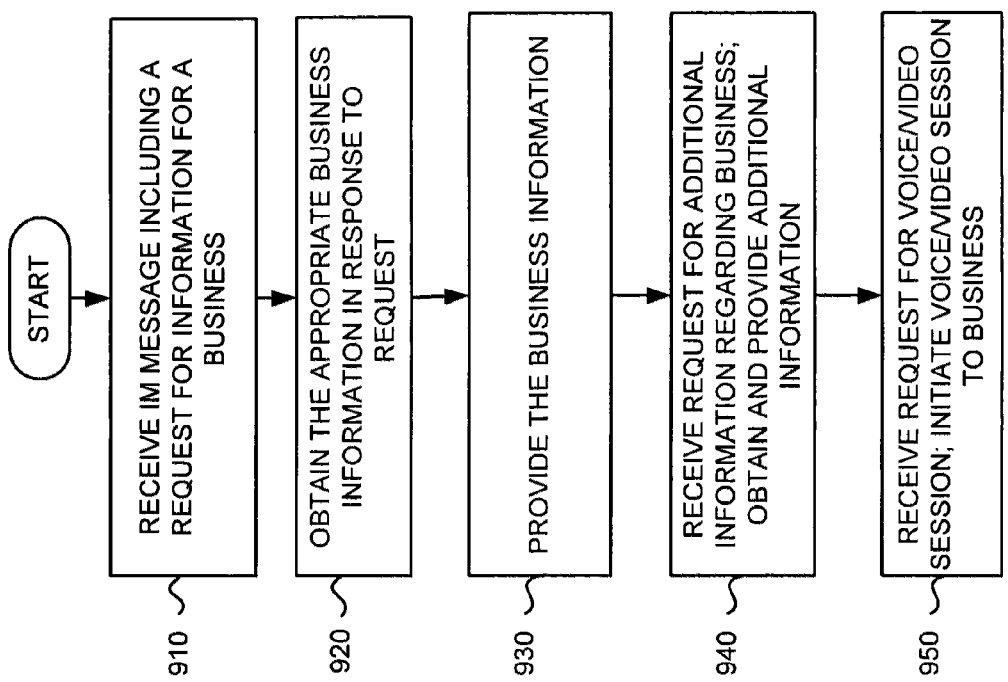
FIG. 9 is a flow chart of exemplary processing for providing business information in an exemplary embodiment.

FIG. 9 is a flow chart of exemplary processing for providing business information in an exemplary embodiment. In one embodiment, the processing of FIG. 9 may be performed by location buddy 230. In another embodiment, some or all of the processing described below may be performed by another device, such as client 210. While the following process is described in relation to providing business information, it will be appreciated that the techniques described herein are equally applicable to providing information for other types of entities, such as individuals.

Processing may begin with location buddy 230 receiving an instant message that includes a request for information for a business (block 910). The request may be received from a client, such as client 210, via instant messenger component 510. The request may include one or more terms relating to a business. For example, the request may include a zip code, a business name (or a part of a business name), an address, a service or product provided by a business, and/or other information relating to a desired business. Location buddy 230 may parse the instant message to identify the information relating to the business. For example, if the received request includes the terms "Find pizza shack 80919," location buddy 230 (e.g., via information identification component 520) may parse the request to identify the terms "pizza shack 80919" for use in obtaining the business information. Moreover, in those situations when the request does not include enough information to identify a business (e.g., the request only includes a zip code), location buddy 230 (e.g., via information identification component 520 and instant messenger component 510) may interact with the user to obtain additional information relating to the business.

Location buddy 230 may obtain appropriate business information in response to the request (block 920). In one embodiment, location buddy 230 (e.g., via information identification component 520) may use one or more terms provided in instant message(s) received from client 210 to identify an entry in database 640. In another embodiment, location buddy 230 may use the one or more terms to identify a ranked list of possible entries from database 640.

For each matching entry in database 640, location buddy 230 may obtain business information from database 640. The business information may include, for example, a business name, a business address, a business telephone number, and/or other information relating to the business (e.g., a map or a link to a map of the business address, an image relating to the business, an advertisement for the business, a video relating to the business or business address, etc.). In one exemplary embodiment, location buddy 230 may be configured to provide certain business information in response to a request from a user. For example, a user may configure location buddy 230 to provide a business address, a business telephone number, and a link to a map of the business address in response to a request from the user for a business.

Location buddy 230 may provide the business information to client 210 (act 930). For example, location buddy 230 may send (e.g., via instant messenger component 510) an instant message to client 210 that includes the business information for a highest ranking entry or a configurable number of highest ranking entries. As indicated above, the business information may include a business name, a business address, a business telephone number, and/or other information relating to the business, such as a network address for establishing a video session with the business or for sending an electronic mail message or instant message to the business.

Location buddy 230 may receive a request for additional information regarding the business from client 210 (block 940). The additional information may include visual and/or audible information, such as a map that shows the location of the business, an image that shows information relating to the business (e.g., a picture of the exterior and/or interior of the business, a logo for the business, an advertisement for the business, etc.), a video that shows information relating to the business (e.g., an advertisement, a video of the front of the business, etc.), and/or other information relating to the business. Location buddy 230 may parse the request to identify what additional information the user is requesting. For example, the request may include the word "map" or other information that indicates a desire to receive a map. If business information for multiple businesses is provided, the user may request additional information for one of the entries by specifying one of the entries. For example, if each set of business information is associated with a number, the user may send an instant message that includes the number associated with the desired set of business information.

If location buddy 230 receives an instant message from client 210 that includes a request for additional information, location buddy 230 may obtain the appropriate additional information (block 940) from, for example, database 640 (e.g., from other information field 665) or from another location, such as a third party server. Location buddy 230 may provide the obtained additional information (block 940) as a file or link to client 210 via instant messenger component 510. The user may, for example, open the file or select the link to obtain the additional information for the business.

Location buddy 230 may receive, from client 210, a request for a voice or video session with the business (block 950). For example, in response to receiving the instant message from location buddy 230 that includes the business information, a user may desire to establish a voice session or a video session with the business. As such, the user may transmit an instant message, via client 210, to location buddy 230 requesting a voice or video session with the business. The request may include the word "call," "voice call," or other information that indicates a desire to initiate a voice session. The request may include the word "video," "video call," or other information that indicates a desire to initiate a video session. The user may request to initiate a voice (or video) session in other ways (e.g., by selecting a button on the instant messenger interface, by selecting a menu item, by selecting a link, etc.). In one embodiment, the request may also include the identification of a preferred user device to be used for the voice (or video) session. Alternatively, location buddy 230 may identify the preferred device for the user using, for example, computer-readable medium 620, using user Presence information, or using location information associated with the user (e.g., location buddy 230 may identify a location of the user and may select a preferred device to use for the voice (or video) session based on the identified location).

If location buddy 230 receives an instant message from client 210 that includes a request to initiate a voice (or video) session with the business, location buddy 230 may initiate a voice (or video) session between client 210 and the business (e.g., destination device 220) (block 950). To initiate the voice (or video) session, location buddy 230 (e.g., via voice/video session establishment component 530) may initiate a voice (or video) session with a preferred device of the user (e.g., instant messenger component 410 of client 210 or another device) and may connect that voice (or video) session with a voice (or video) session with destination device 220 (associated with the business). In one exemplary embodiment, the initiation of a voice (or video) session with destination device 220 may involve location buddy 230 sending a voice session establishment request to a SIP application server, which may establish the voice session through an IMS network. In this way, an instant messenger user may promote a location query (to location buddy 230) to a voice (or video) session between the instant messenger user and a location query result.

In one exemplary embodiment, the instant messenger user may be charged a fee for the voice (or video) session. In another exemplary embodiment, some of the fee or the entire fee may be paid by the business to which the voice (or video) session is established (or by another entity).

Figure 10A:
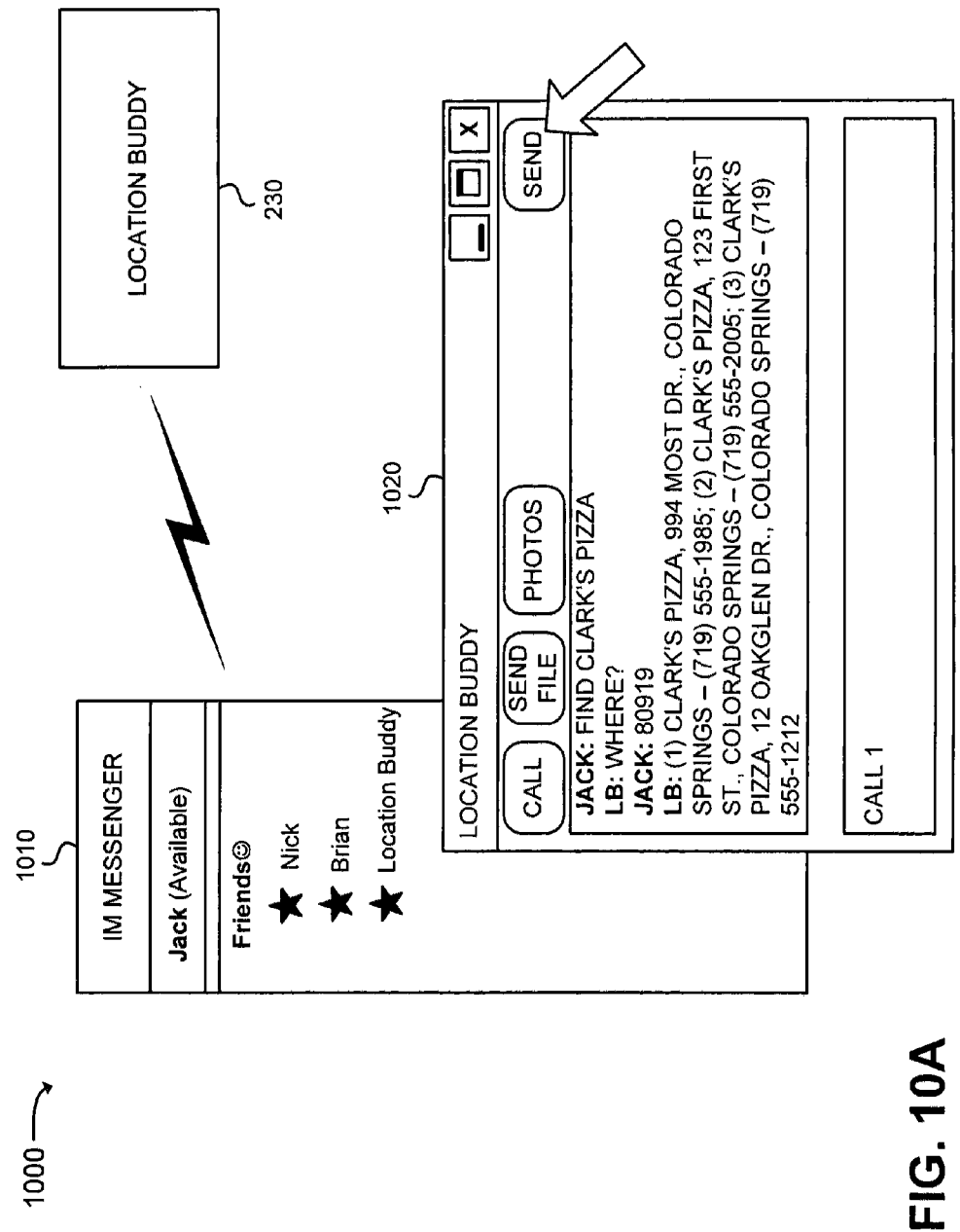
FIGS. 10A-11C illustrate examples of the processing described with respect to FIG. 9.

The following examples of FIGS. 10A-11C illustrate the processing described above with respect to FIG. 9. In a first example 1000 described with respect to FIGS. 10A-10F, assume that a user (Jack) is currently running an instant messenger 1010 on a client (not shown), as illustrated in FIG. 10A. Assume further that Jack initiates a chat session with location buddy 230 in order to find location information regarding a local pizza restaurant, called "Clark's Pizza." To initiate the chat session, Jack may, for example, double click on "Location Buddy" in instant messenger 1010, which may cause a chat window 1020 to be presented to Jack. Jack may then send a request to location buddy 230 for information on Clark's Pizza. For example, as indicated in FIG. 10A, Jack sends "FIND CLARK'S PIZZA" to location buddy 230.

Location buddy 230 may determine whether the request includes enough information to be able to identify a business or set of businesses. In this example, assume, as illustrated in FIG. 10A, that location buddy 230 requests additional information from the user by sending an instant message to Jack's instant messenger interface 1020 asking for a general location of the desired business. Assume that, in response to the instant message, Jack sends an instant message to location buddy 230 with the zip code where the desired pizza restaurant is located, as illustrated in FIG. 10A.

In response to receiving the zip code, assume that location buddy 230 uses the restaurant's name and the zip code to look up the appropriate business information from, for example, database 640. Assume that three Clark's Pizzas are located in the zip code provided by Jack. Location buddy 230 may obtain business information for the three Clark's Pizzas and may provide the three sets of business information to Jack in an instant message (or multiple instant messages), as illustrated in FIG. 10A. In this example, assume that the business information includes an address and a telephone number. Location buddy 230 may provide the sets of business information in a ranked order (e.g., based on one or more factors, such as a distance from the center of the provided zip code, based on a distance from Jack's location (if known), etc.).

Assume that, in response to receiving the sets of business information, Jack desires to call the Clark's Pizza located on Most Drive. To initiate the call, Jack may send an instant message to location buddy 230 that indicates "CALL 1." The "CALL" portion of the instant message may indicate to location buddy 230 the desire to establish a voice session and the "1" portion of the instant message may indicate that the voice session is to be established with the Clark's Pizza listed as number 1. Jack may identify the Clark's Pizza on Most Drive in other ways. For example, Jack may send an instant message to location buddy 230 that indicates "CALL MOST DRIVE," "CALL 555-1985," "CALL 1985," etc.

Figure 10B:
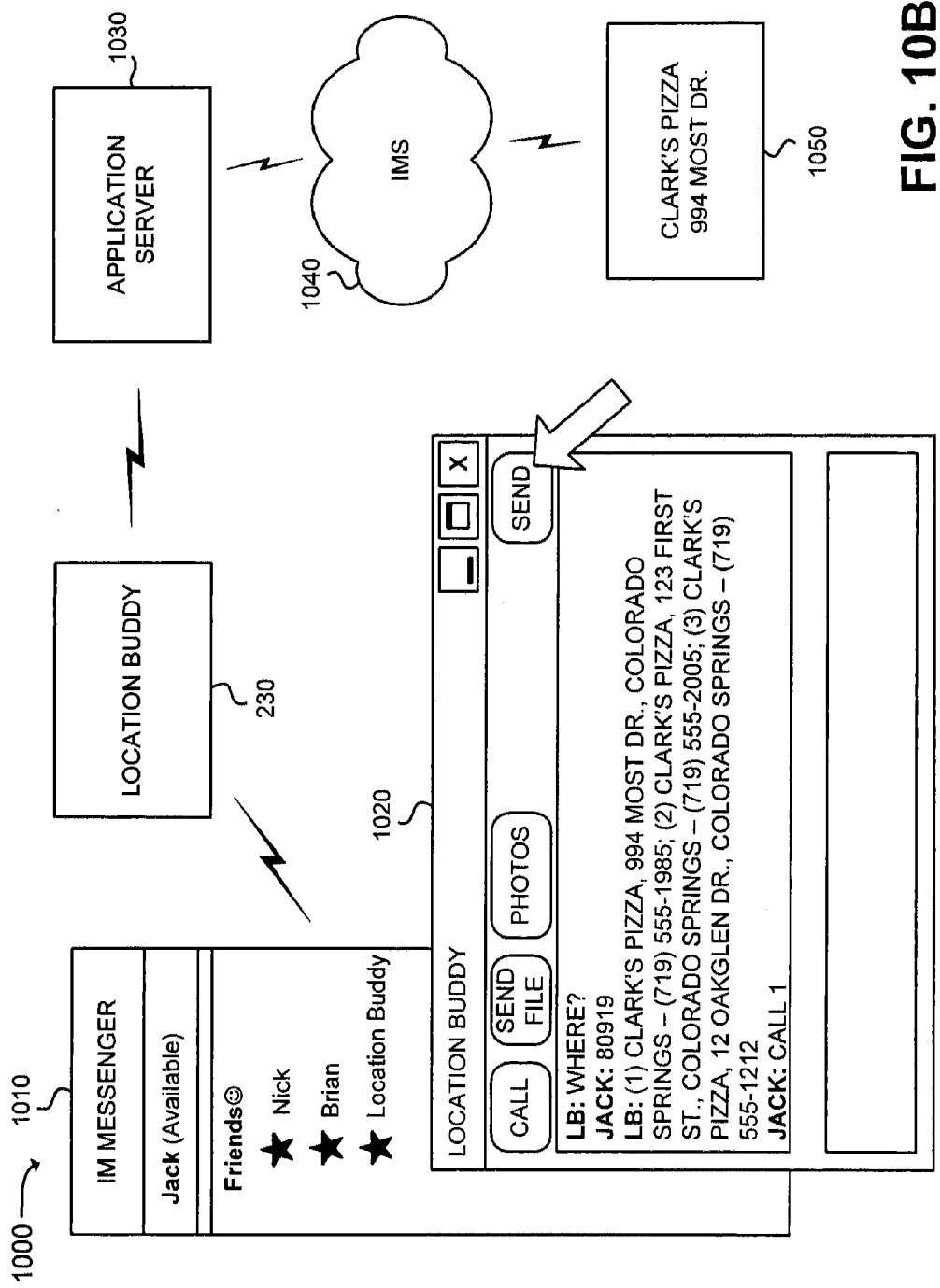

In response to receiving the instant message from Jack indicating that a voice session is to be established to the Clark's Pizza on Most Drive, location buddy 230 may establish a voice session with a preferred device associated with Jack, establish a voice session with a device at Clark's Pizza on Most Drive, and combine the two voice sessions to establish a voice session between the preferred device associated with Jack and the device at Clark's Pizza on Most Drive. In one exemplary embodiment, as illustrated in FIG. 10B, location buddy 230 may send a request for the voice session to an application server 1030, which may establish the session with Clark's Pizza 1050 via an IMS network 1040. Location buddy 230 may alternatively establish the session with Clark's Pizza 1050 using other network devices and networks.

Figure 10C:
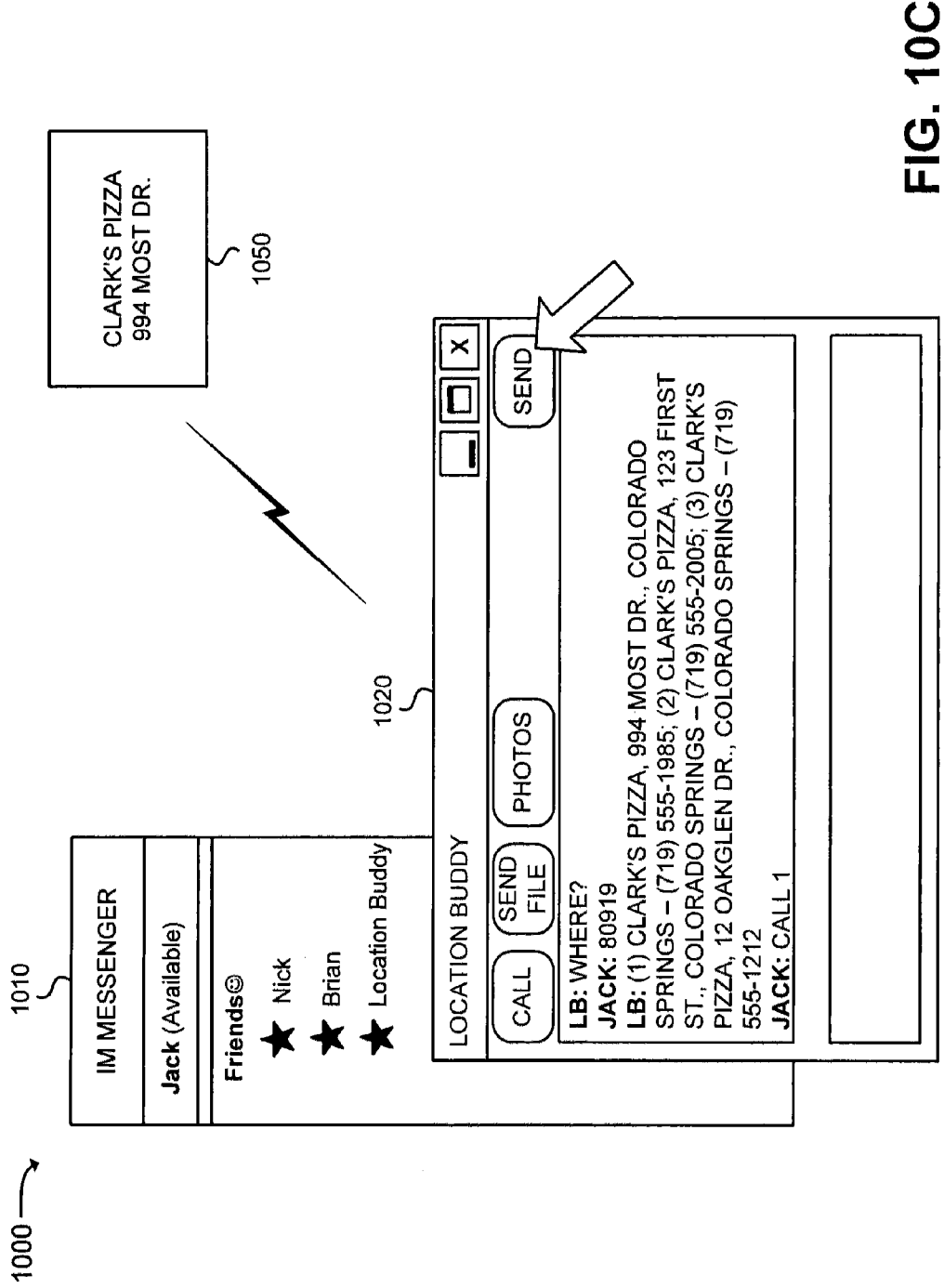
Figure 10D:
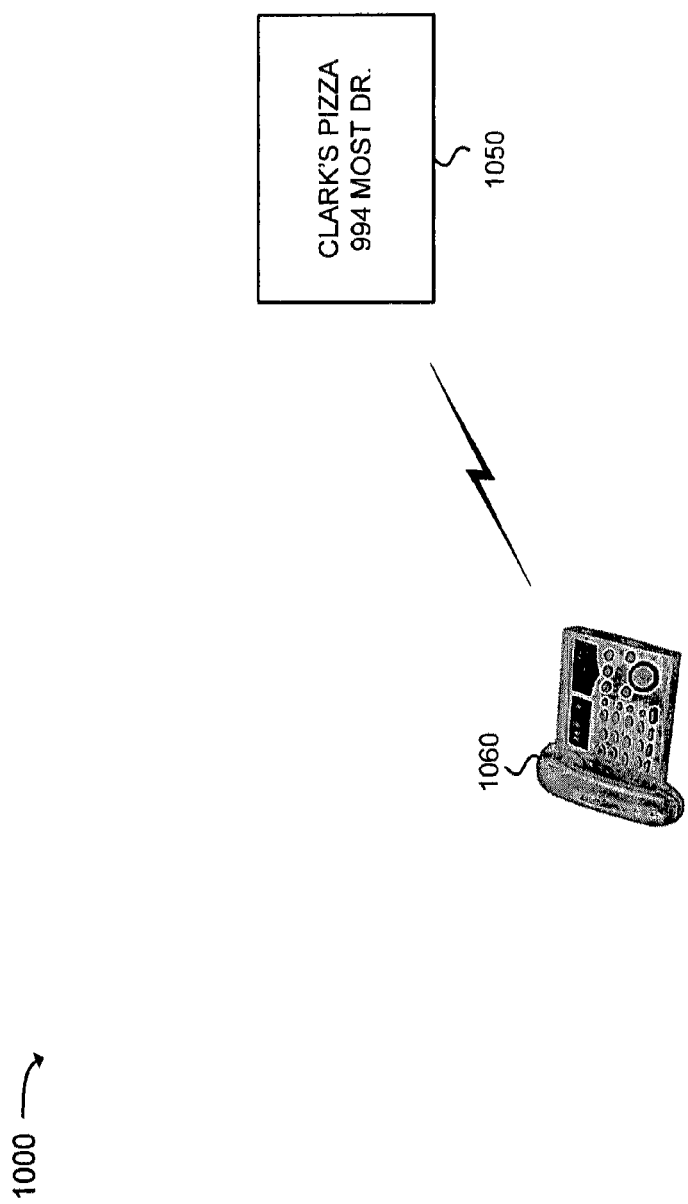
Figure 10E:
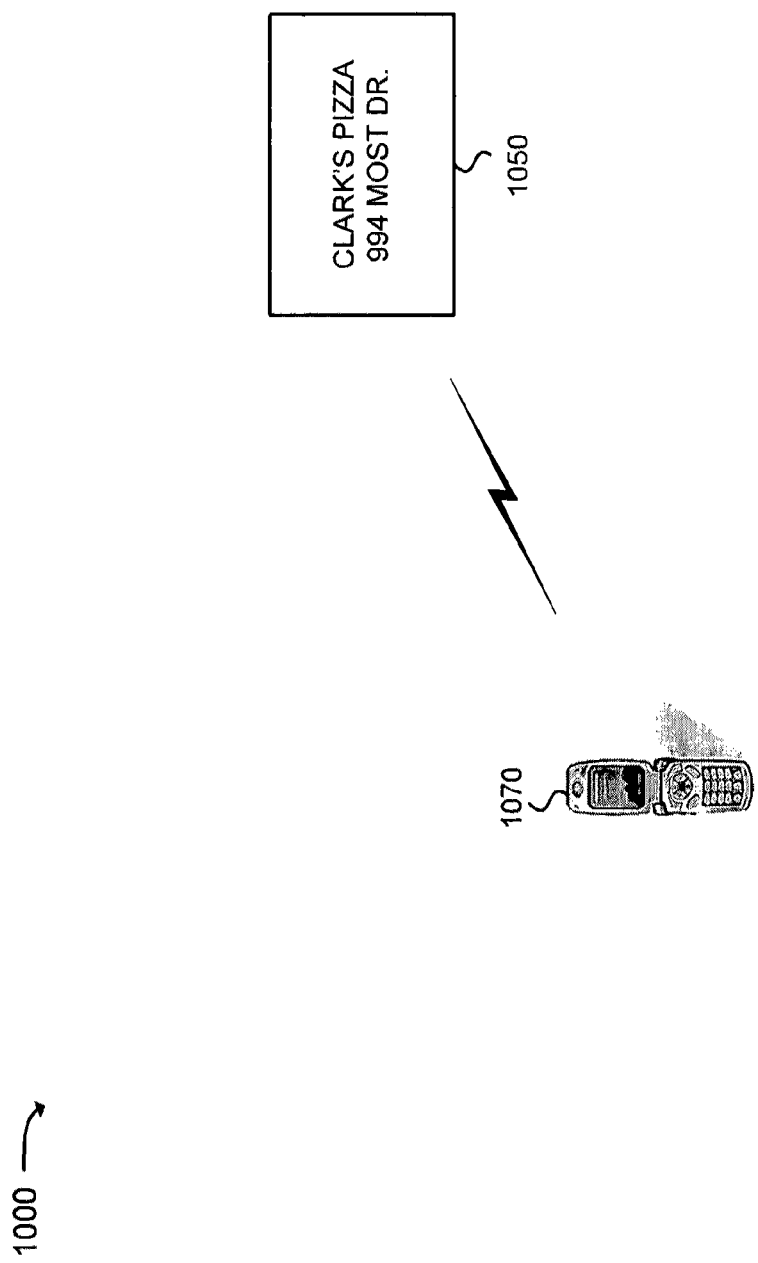

As indicated above, location buddy 230 may identify Jack's preferred device in a number of ways. For example, location buddy 230 may look up the preferred device from a computer-readable medium, such as computer-readable medium 620, identify the preferred device from an instant message sent from Jack (e.g., Jack may identify the preferred device in an instant message to location buddy 230), identify the preferred device based on a location of Jack, Jack's Presence information, or in other ways. In one exemplary embodiment, Jack's preferred device may include Jack's instant messenger 1010. Thus, as illustrated in FIG. 10C, location buddy 230 may establish the voice session between Jack's instant messenger 1020 and Clark's Pizza 1050. In a second exemplary embodiment, Jack's preferred device may include a POTS or SIP telephone. Thus, as illustrated in FIG. 10D, location buddy 230 may establish the voice session between Jack's POTS or SIP telephone 1060 and Clark's Pizza 1050. In a third exemplary embodiment, Jack's preferred device may include a cell phone. Thus, as illustrated in FIG. 10E, location buddy 230 may establish the voice session between Jack's cell phone 1070 and Clark's Pizza 1050. In a fourth exemplary embodiment, assume that Jack has requested that a video session be established. In this exemplary embodiment, Jack's preferred device may include a computer device. Thus, as illustrated in FIG. 10F, location buddy 230 may establish a video session between Jack's computer device 1080 and Clark's Pizza 1050.

Figure 11A:
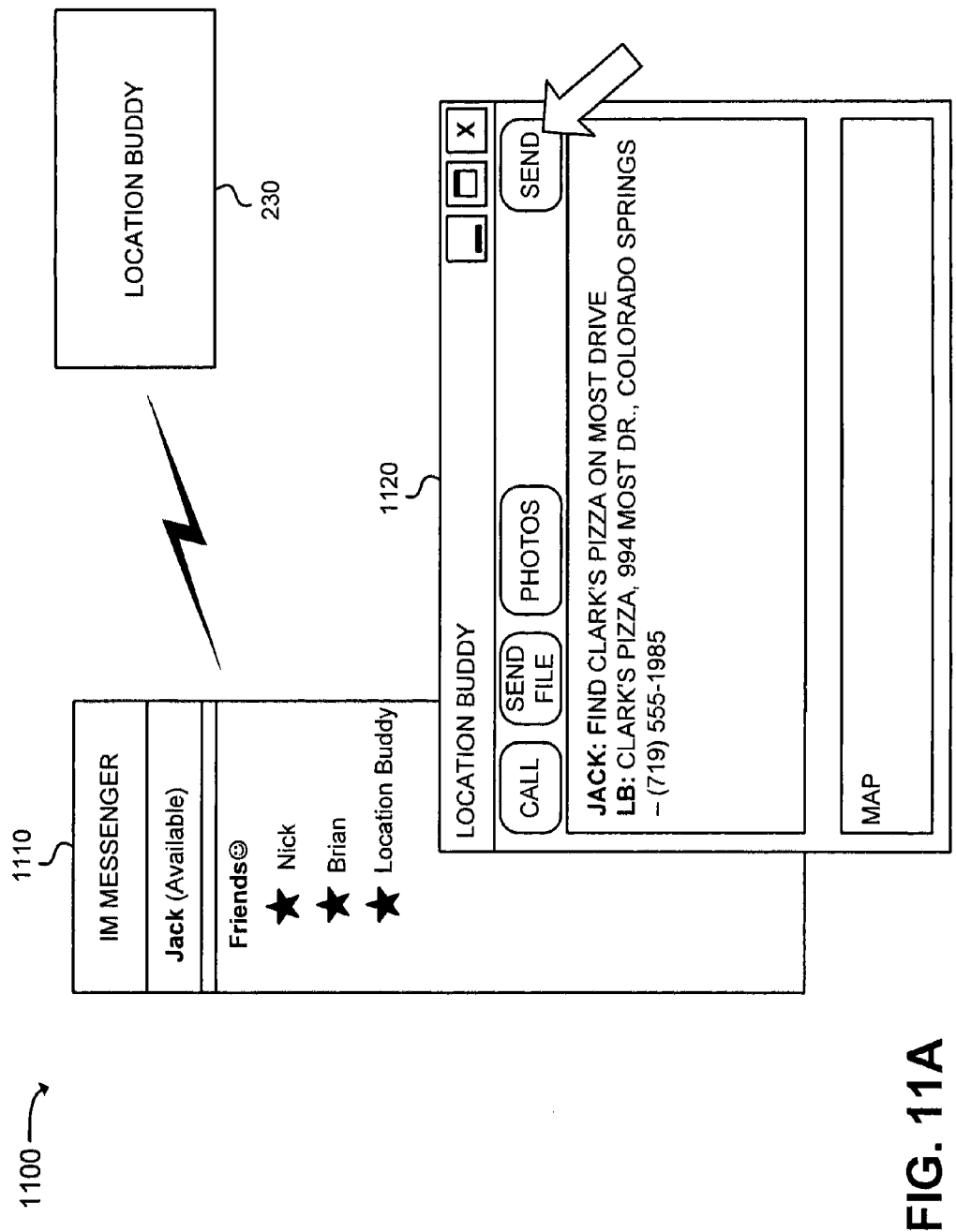
Figure 11B:
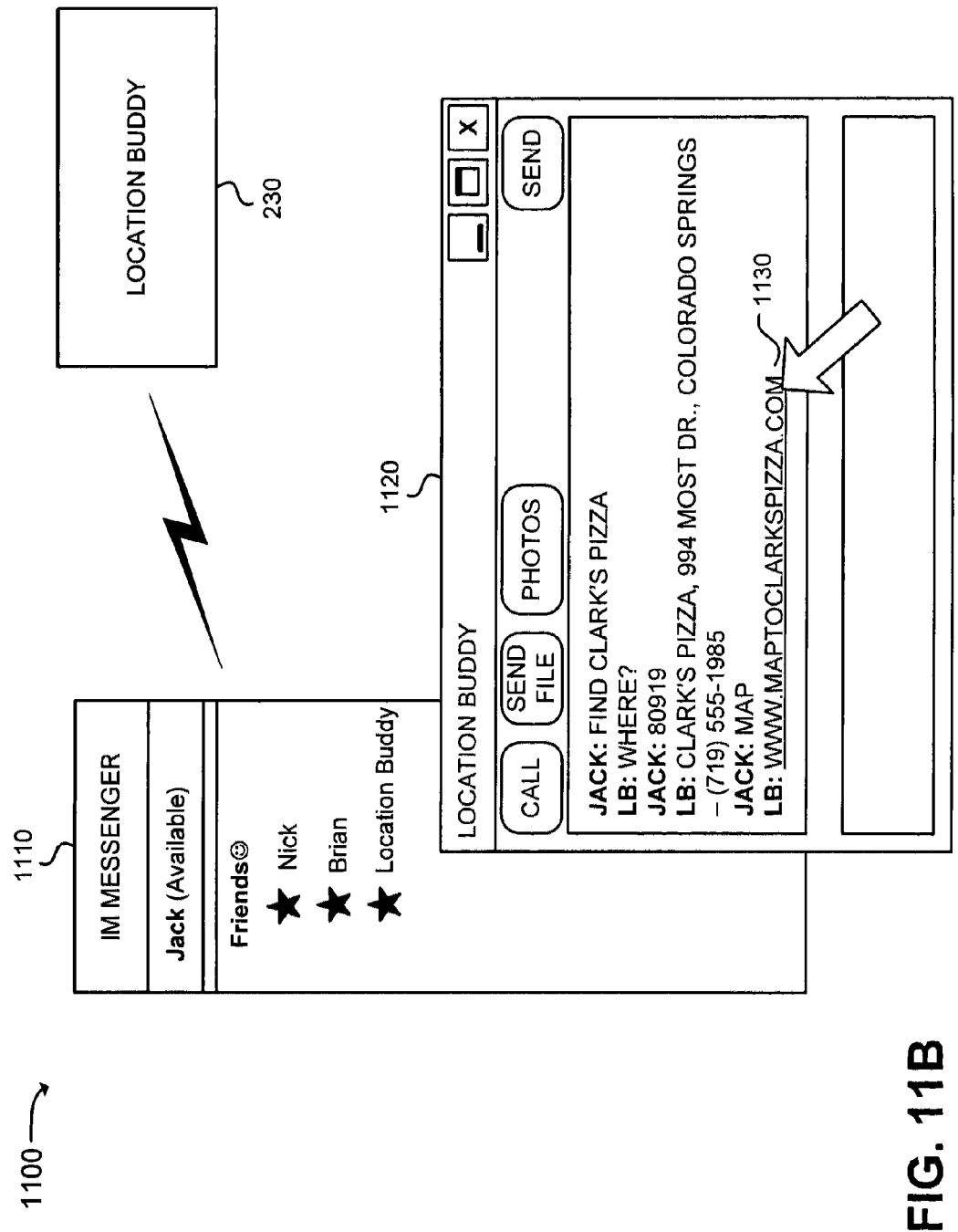
Figure 11C:
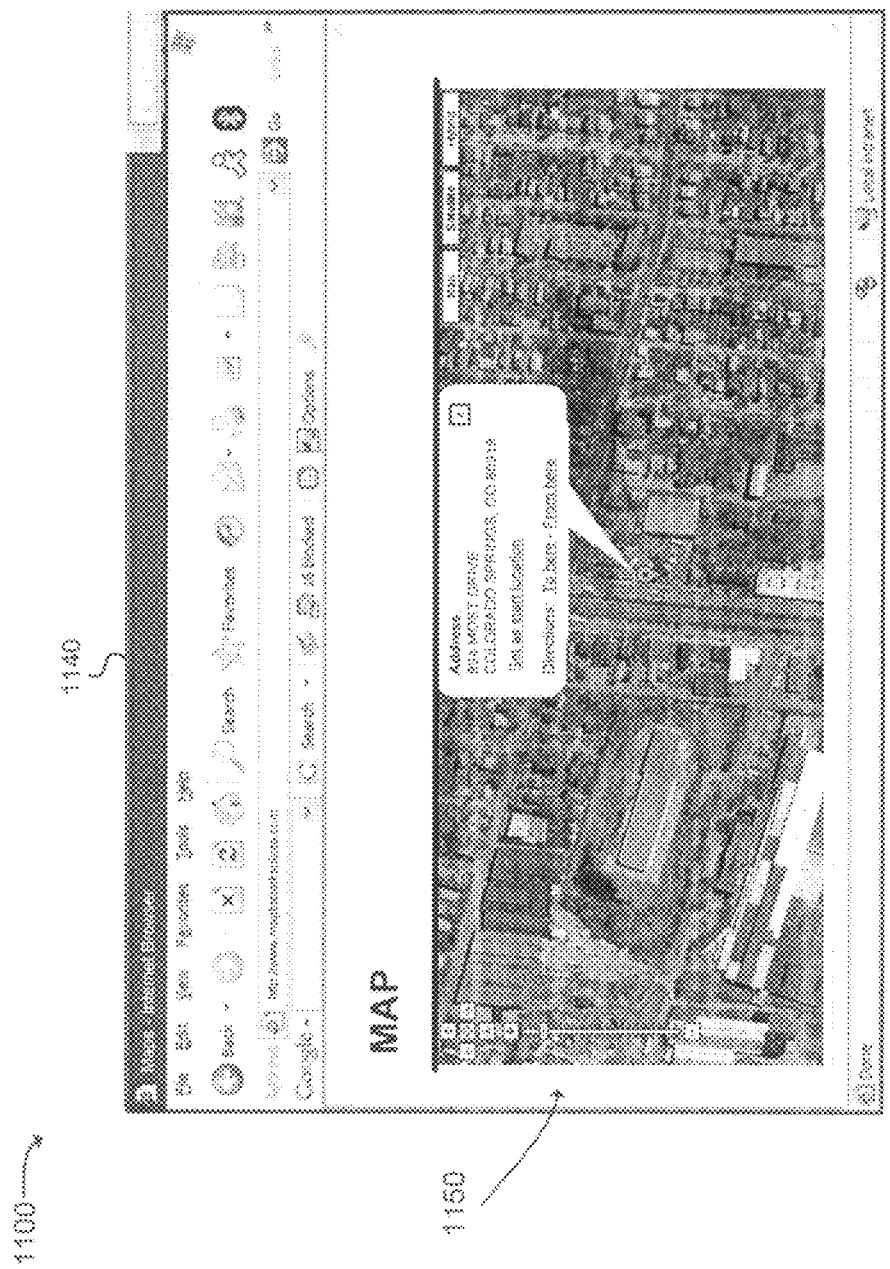

In a second example 1100 set forth in FIGS. 11A-11C, assume that, similar to the example above, a user (Jack) is currently running an instant messenger 1110 on a client (not shown), as illustrated in FIG. 11A. Assume further that Jack initiates a chat session with location buddy 230 in order to find location information regarding a local pizza restaurant, called "Clark's Pizza." To initiate the chat session, Jack may, for example, double click on "Location Buddy" in instant messenger 1110, which may cause a chat window 1120 to be presented to Jack. Jack may send a request to location buddy 230 for information on Clark's Pizza. For example, as indicated in FIG. 11A, Jack sends "FIND CLARK'S PIZZA ON MOST DRIVE" to location buddy 230.

Location buddy 230 may use the restaurant's name and partial address to look up the appropriate business information from, for example, database 640. Assume, as illustrated in FIG. 11A, location buddy 230 provides business information for Clark's Pizza on Most Drive. In this example, assume that the business information includes an address and a telephone number.

Assume that, in response to receiving the business information, Jack desires to obtain a map for Clark's Pizza. To obtain the map, Jack may send an instant message to location buddy 230 that indicates "MAP" or other information that indicates a desire to obtain a map.

In response to the instant message requesting a map, location buddy 230 may obtain a map or a link to a map from, for example, database 640 or another source. Assume, as illustrated in FIG. 11B, location buddy 230 provides a link 1130 to a map of the location of Clark's Pizza on Most Drive to Jack via an instant message. Assume that Jack selects link 1030, as illustrated in FIG. 11B, by, for example, clicking on link 1030. In response, Jack's client may obtain the map from the location indicated in link 1130. For example, as illustrated in FIG. 11C, Jack's client may cause a browser window 1140 to be provided to Jack that includes a map 1150 of the desired location (i.e., a map of Clark's Pizza on Most Drive).

Embodiments described herein promote a location buddy that provides location information for businesses and/or individuals. Users may promote an instant messaging session with the location buddy to a multimedia session with a business and/or individual identified in the instant messaging session.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 7 and 9, the order of the acts may be varied in other implementations consistent with the invention. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a memory to store instructions; and
a processor to execute the instructions to:
receive a first instant message from a first device associated with a user, the first instant message requesting information associated with a first entity that includes a business or an individual, the user, the first entity, and a second entity associated with the device being different, the first instant message including an identifier associated with the first entity, a location associated with the first entity, and a command to search for the information, obtain, based on receiving the first instant message and based on the identifier and the location, the requested information, provide a second instant message to the first device, the second instant message including the requested information, receive a third instant message from the first device, the third instant message requesting one of an audio session or a video session with the first entity, select, based on receiving the third message, one of a second device or a third device that differs from the second device, the one of the second device or the third device being selected from a plurality of devices associated with the user based on one or more criteria, the one or more criteria including a time associated with the third instant message, the first device being different from the one of the second device or the third device, the second device being selected when the third instant message requests the audio session, and the third device being selected when the third instant message requests the video session, and cause the one of the audio session or the video session to be established between the one of the second device or the third device, associated with the user, and a fourth device associated with the first entity, the processor, when causing the one of the audio session or the video session to be established, being further to:

initiate a first multimedia session between the device and the selected one of the second device or the third device, send, to a session initiation protocol (SIP) application server, a request to establish a second multimedia session between the device and the fourth device, and connect the first multimedia session and the second multimedia session to establish the one of the audio session or the video session between the one of the second device or the third device and the fourth device.

2. The device of claim 1, where the processor is further to:
receive a fourth instant message from the user requesting a map relating to the first entity,
obtain, based on the information obtained based on the first instant message, the requested map, and
provide at least one of a file or a link to the user via a fifth instant message, the at least one of a file or a link relating to the obtained map.

3. The device of claim 1, where the processor is further to:
receive a fourth instant message from the user requesting an image or a video relating to the first entity,
obtain, based on the information obtained based on the first instant message, the image or the video, and
provide at least one of a file or a link to the user via a fifth instant message, the at least one of a file or a link relating to the image or the video.

4. The device of claim 1, where the requested information includes an address and a telephone number associated with the first entity.

5. The device of claim 1, where the one of the second device or the third device, associated with the user, includes at least one of a Plain Old Telephone System (POTS) telephone, a Session Initiation Protocol (SIP) telephone, a cell phone, or a computer device, and
where the fourth device, associated with the first entity, includes at least one of another POTS telephone, another SIP telephone, another cell phone, or another computer device.

6. A method performed by a server device, the method comprising:
receiving, by the server device, a first instant message, from a first device associated with a user, requesting information associated with a first entity that includes a business or an individual,
the user, the first entity, and a second entity associated with the server device being different,
the first instant message including an identifier associated with the first entity, a location associated with the first entity, and a command to search for the information;
obtaining, by the server device and based on receiving the first instant message, the requested information based on the location and the identifier;
providing, by the server device and based on the obtained information, a second instant message to the first device;
receiving, by the server device, a third instant message from the first device, the third instant message including a request to establish, based on the second instant message, one of a voice session or a video session between the user and the first entity;
identifying, by the server device, a plurality of candidate devices associated with the user and to which voice sessions or a video session can be established;
selecting, by the server device, one of the plurality of candidate devices based on the request to establish the one of the voice session or the video session and based on at least one criteria that includes a time when the third instant message is received, the selected one of the plurality of candidate devices differing from the first device; and
automatically establishing, by the server device and via the selected one of the plurality of candidate devices, the one of the voice session or the video session between the user and the first entity, the automatically establishing of the one of the voice session or the video session including:
initiating, by the server device, a first session between the server device and the selected one of the plurality of candidate devices,
sending, from the server device and to a session initiation protocol (SIP) application server, a request to establish a second session between the server device and a device associated with the first entity, and
connecting, by the server device, the first session and the second session to form the one of the voice session or the video session.

7. The method of claim 6, where the selected one of the plurality of candidate devices includes at least one of a Public Switched Telephone Network (PSTN) telephone, a Session Initiation Protocol (SIP) telephone, a wireless telephone, or a computer device.

8. The method of claim 6, further comprising:
receiving, from the first device, a fourth instant message that includes a request for additional information relating to the first entity;
obtaining the requested additional information; and
providing, to the first device and via a fifth instant message, information relating to the obtained additional information.

9. The method of claim 8, where the obtained additional information includes an image or a video related to the first entity.

10. A device comprising:
a memory to store instructions; and
a processor to execute the instructions to:
receive a first instant message, from a first device associated with a user, the first instant message requesting location information associated with a first entity that includes a business or an individual,
the user, the first entity, and a second entity associated with the device being different,
the first instant message including an identifier associated with the first entity, information identifying a location associated with the first entity, and a command to search for the location information,
automatically obtain location information associated with the first entity based on receiving the command included in the first instant message and based on the identifier and the location,
provide, in a second instant message, the obtained location information to the first device,
receive a third instant message, from the first device, the third instant message requesting one of a voice session or a video session with the first entity,
identify a second device, from a plurality of devices associated with the user and to which one of the voice session or the video session can be established, the second device differing from the first device,
the second device being identified based on the one of a voice session or the video session and based on one or more criteria, the one or more criteria including a time associated with the third instant message, and
based on receiving the third instant message, automatically cause the one of the voice session or the video session to be established between the user, via the identified second device, and the first entity,
the processor, when causing the one of the voice session or the video session to be established, being further to:
initiate a first session between the device and the identified second device,
send a request, to a session initiation protocol (SIP) application server, to establish a second session between the device and the first entity, and
connect the first session and the second session to establish the one of the voice session or the video session between the identified second device and the first entity.

11. The device of claim 10, where the location information includes an address of the first entity.

12. The device of claim 10, where the first device includes a Public Switched Telephone Network (PSTN) telephone, a Session Initiation Protocol (SIP) telephone, a wireless telephone, or a computer device.

13. The device of claim 10, where the processor is further to:
receive, from the first device, a fourth instant message that includes a request for additional information relating to the first entity,
obtain the requested additional information, and
provide, to the first device and in a fifth instant message, information relating to the obtained additional information.

14. The device of claim 13, where the obtained additional information includes a file including an image or a video associated with the first entity or a link to the image or the video associated with the first entity.

15. A device comprising:
a memory to store instructions; and
a processor to execute the instructions to:
receive, from a user and during an instant messaging session between the user and the device, first information including an identifier associated with a first entity that includes a business or individual, a location associated with the first entity, and information instructing the device to search for second information associated with the first entity, the user, the first entity, and a second entity associated with the device being different, the processor, when receiving the first information, being further to:
present, to the user and during the instant messaging session, a third information identifying a plurality of entities that are relevant to the first information,
receive, from the user and during the instant messaging session, a selection of the first entity from the plurality of entities, and
identify the first information based on the selection, and
change the instant messaging session into a multimedia session between the user and the first entity, the processor, when changing the instant messaging session into the multimedia session, being further to:
determine, based on the first information and the second information, whether the multimedia session is one of a video session or an audio session,
select, from a plurality of devices associated with the user, one of a first device or a second device that differs from the first device, the first device being different from the one of the second device or the third device, the processor being further to select the one of the first device or the second device based on whether the multimedia session is the video session or the audio session and based on a time associated with the instant messaging session,
initiate a first multimedia session between the device and the selected one of the first device or the second device, and
send, to a session initiation protocol (SIP) application server, a request to couple, based on the second information, the first entity to the first multimedia session to form the one of the video session or the audio session.

16. The device of claim 15, where the first device includes a telephone device, and
where the device includes a server device.

17. The device of claim 15, where, when changing the instant messaging session to the multimedia session, the processor is to:
establish at least a portion of the multimedia session through an Internet Protocol Multimedia Subsystem (IMS) network.

18. The device of claim 15, where the processor is further to:
provide, to the user and based on receiving the first information, third information relating to the first entity,
where the third information includes:
a file including an image or a video associated with the first entity, or
a link to the image or the video.

* * * * *